(12) United States Patent
Nielsen et al.

(10) Patent No.: US 9,970,799 B2
(45) Date of Patent: May 15, 2018

(54) SYSTEM OF ULTRASONIC CONSUMPTION METERS WITH PRESSURE SENSORS

(71) Applicant: Kamstrup A/S, Skanderborg (DK)

(72) Inventors: Søren Tønnes Nielsen, Solbjerg (DK); Peter Schmidt Laursen, Skanderborg (DK); Jens Lykke Sørennsen, Beder (DK)

(73) Assignee: KAMSTRUP A/S, Skanderborg (DK)

( * ) Notice: Subject to any disclaimer, the term of this patent is extended or adjusted under 35 U.S.C. 154(b) by 39 days.

(21) Appl. No.: 15/320,671

(22) PCT Filed: Jun. 19, 2015

(86) PCT No.: PCT/DK2015/050174
§ 371 (c)(1),
(2) Date: Dec. 20, 2016

(87) PCT Pub. No.: WO2015/192857
PCT Pub. Date: Dec. 23, 2015

(65) Prior Publication Data
US 2017/0153137 A1    Jun. 1, 2017

(30) Foreign Application Priority Data

Jun. 20, 2014 (EP) .................................. 14173203

(51) Int. Cl.
*G01B 7/16* (2006.01)
*G01F 1/66* (2006.01)
(Continued)

(52) U.S. Cl.
CPC .............. *G01F 1/667* (2013.01); *G01B 7/18* (2013.01); *G01L 1/16* (2013.01); *G01L 1/22* (2013.01); *G01L 5/042* (2013.01)

(58) Field of Classification Search
CPC ... G01F 1/667; G01F 1/66; G01F 1/88; G01B 7/18; G01B 7/16; G01B 5/30; G01L 1/22; G01L 1/16; G01L 5/042; G08C 19/00
(Continued)

(56) References Cited

U.S. PATENT DOCUMENTS 5,731,527 A * 3/1998 Van Cleve ............ G01F 1/8477
138/172
2002/0078760 A1 * 6/2002 Matsushima ........... G01F 1/667
73/861.29
(Continued)

FOREIGN PATENT DOCUMENTS

EP         2131162 A1   12/2009
WO    2013/041104 A1    3/2013

OTHER PUBLICATIONS

International Search Report for corresponding Patent Application No. PCT/DK2015/050174 dated Sep. 9, 2015.
(Continued)

*Primary Examiner* — Manish S Shah
*Assistant Examiner* — Nigel Plumb
(74) *Attorney, Agent, or Firm* — Renner, Otto, Boisselle & Sklar, LLP.

(57) ABSTRACT

A system of a plurality of ultrasonic consumption meters 100 each arranged in a utility network 1 for measuring consumption data of a utility in terms of a supplied fluid, the utility network 1 further comprising a data collector 2 for collecting the consumption data is provided, wherein: Each of the ultrasonic consumption meters 100 are arranged to measure a flow rate of the supplied fluid and a pressure of the supplied fluid, the consumption meters 100 comprising: A flow tube 110 with a through-going opening 112 for passage of a fluid between an inlet and an outlet, the flow tube having a wall with an outer surface 114; two ultrasonic transducers 120, 122 arranged at the outer surface 114 of the
(Continued)

flow tube 110, so that ultrasonic signals are transmitted through the wall; a control circuit 30 arranged for operating the two ultrasonic transducers 120, 122 and to generate a signal indicative of the flow rate of the fluid; and a communication module 140 connected to the control circuit 130 and arranged for communicating the signal indicative of the flow rate of the fluid to the data collector 2; wherein the control circuit 130 is arranged for operating a first strain gauge 150 arranged at the outer surface 114 of the flow tube 110 to generate a signal indicative of the pressure of the fluid, and 1 wherein the communication module 140 is arranged for communicating the signal indicative of the pressure of the fluid to the data collector 2. The consumption meters 100 of the system are capable of obtaining and communicating data relating to flow and pressure in a utility network to an operator of the network for proper operation of the network.

14 Claims, 6 Drawing Sheets

(51) Int. Cl.
*G01L 1/16* (2006.01)
*G01L 5/04* (2006.01)
*G01L 1/22* (2006.01)

(58) Field of Classification Search
USPC .......................................... 73/774, 763, 760
See application file for complete search history.

(56) References Cited

U.S. PATENT DOCUMENTS

| | | | |
|---|---|---|---|
| 2006/0145683 A1* | 7/2006 | Shigeta | G01F 1/667 324/76.54 |
| 2008/0066557 A1* | 3/2008 | Yoshida | G01F 1/66 73/861.02 |
| 2010/0188261 A1* | 7/2010 | Fujii | F23N 5/242 340/870.02 |
| 2011/0094309 A1* | 4/2011 | Berger | G01F 1/662 73/861.28 |
| 2014/0109686 A1* | 4/2014 | Ramsay | G01F 1/66 73/861.18 |

OTHER PUBLICATIONS

International Preliminary Report on Patentability for corresponding Patent Application No. PCT/DK2015/050174 dated Sep. 8, 2016.

\* cited by examiner

SYSTEM OF ULTRASONIC CONSUMPTION METERS WITH PRESSURE SENSORS

This application is a national phase of International Application No. PCT/DK2015/050174 filed Jun. 19, 2015 and claims priority to European Application No. 14173203.2 filed Jun. 20, 2014 and published in the English language.

FIELD OF THE INVENTION

The present invention relates to a system of ultrasound consumption meters for measuring consumption data of a supplied utility, such as water, gas, heating, or cooling. In particular, the invention relates to a system of consumption meters arranged to measure a flow rate of a supplied fluid and a pressure of the supplied fluid.

BACKGROUND OF THE INVENTION

A consumption meter may be used for measuring utility usage in connection with supply of the utility, e.g. of water, gas, heating, or cooling, and may in turn be used in connection with charging of the consumed quantity. Consumption meters may be used in connection with district heating, district cooling and/or distributed water or gas supply.

By way of measuring principle, consumption meters may be based on ultrasonic flow measurement and include an ultrasonic flow meter part. Thus an ultrasonic flow meter may be a transit time flow meter arranged to measure a flow rate of a fluid flowing in a flow channel by use of known operation principles for transit time flow meters.

Other parameters than the flow rate may be of interest to the operator of a utility supply line as well. Thus with consumption meters relating to utilities like water, heating and cooling it is customary that the meter comprises one or more temperature sensors to measure the temperature of the supplied fluid, either for billing purposes as with heating and cooling applications, or for survey purposes relating to e.g. bacterial growth or freezing warnings as with water supply applications. Also sensors relating to measurement of the pressure are known with flow meter technology of the prior art.

One elegant type of pressure sensor is a strain gauge. According to the prior art strain gauges may be applied with flow meters to determine the flow rate, e.g. according to the Venturi principle.

Thus GB 801,334 to General Electric discloses a fluid flow meter with a curved tube which has strain gauges attached to the tube at a fixed end of the tube, where the tube walls are thinner than elsewhere. The curved tube changes the direction the flow, and the reactive forces are measured by the strain gauges so as to calculate the flow rate based on the strain gauge readings.

Likewise with U.S. Pat. No. 7,237,440 B2 to CIDRA Corporation a combination of strain sensors and ultrasonic sensors is applied to measure a pressure field, e.g. in terms of vertical disturbances, moving with a process flow, and to measure the speed of sound propagating through the fluid flowing in a pipe.

Strain gauges may as well be applied with flow meter technology to control the flow meter.

U.S. Pat. No. 5,731,527 to Micro Motion, Inc. discloses a Coriolis flow meter wherein flow tubes employing anisotropic materials such as fiber reinforced composites are equipped with strain gauges to detect the internal pressure of the tube and the stress created by the wall deformation.

Likewise, EP 1 426 741 A1 to Krohne AG discloses a Coriolis mass through-flow meter with strain gauges for pressure measurements. With the through-flow meter a strain gauge is attached to the flow tube and further coupled to a pressure signal unit to read out a pressure signal based on the signal from the strain gauges, which in turn may be used to correct the mass flow rate signal outputted by the Coriolis mass through-flow meter for the pressure of the medium flowing therein.

Whereas the above applications of strain gauges are directed towards operation of flow meters per se, i.e. for local operation or control thereof, there is still as need for a system of consumption meters which is capable of measuring consumption data as well as data relating to the utility network pressure and to communicate these data to an operator of the utility network.

SUMMARY OF THE INVENTION

Accordingly it would be advantageous to achieve a system of consumption meters to fulfil the above need.

Accordingly, in a first aspect of the invention there is provided a system of a plurality of ultrasonic consumption meters each arranged in a utility network for measuring consumption data of a utility in terms of a supplied fluid, the utility network further comprising a data collector for collecting the consumption data, wherein:
each of the ultrasonic consumption meters are arranged to measure a flow rate of the supplied fluid and a pressure of the supplied fluid, the consumption meters comprising:
   a flow tube with a through-going opening for passage of a fluid between an inlet and an outlet, the flow tube having a wall with an outer surface;
   two ultrasonic transducers arranged at the outer surface of the flow tube, so that ultrasonic signals are transmitted through the wall;
   a control circuit arranged for operating the two ultrasonic transducers and to generate a signal indicative of the flow rate of the fluid; and
   a communication module connected to the control circuit and arranged for communicating the signal indicative of the flow rate of the fluid to the data collector;
characterized in that
the control circuit is arranged for operating a first strain gauge arranged at the outer surface of the flow tube to generate a signal indicative of the pressure of the fluid, and wherein the communication module is arranged for communicating the signal indicative of the pressure of the fluid to the data collector.

A system of consumption meters is thus provided in a utility network, wherein the consumption meters operate according to the ultrasonic principle and which comprise a strain gauge at the outer surface of their flow tube for measuring the pressure of the fluid, and wherein the communication module, beyond being arranged for communicating data related to the flow rate of the fluid, is arranged for communicating data related to the pressure of the fluid to a data collector.

In the context of the present invention "a strain gauge" should be understood as a device to be used to measure strain on an object according to the principle of that, as the object and in turn the strain gauge arranged thereon are deformed, changing the electrical resistance of the strain gauge. Typically strain gauges consist of a thin layer of patterned metallic foil with narrow lines connected in series and supported on an insulating flexible backing of polymer, the strain gauge being more sensitive to strain in one direction that in other directions, and being arranged on the object to measure strain in the direction of high sensitivity. According to the invention, however, the strain gauge may have any structure fulfilling the above principle.

According to the invention the strain gauge is arranged at the outer surface of the flow tube. Being adhered to the outer surface of the flow tube, the strain gauge will deform upon any deformation of the flow tube. Thus, upon applying a pressure to the flow tube by means of the pressure of the fluid flowing therein, the flow tube may deform, causing the strain gauge thereon to deform as well. Upon deformation, i.e. on e.g. stretching of the lines of strain gauge, their resistance increase, which in turn may be measured e.g. with a Wheatstone bridge.

Thus the strain gauge is operated by the control circuit, i.e. a voltage is applied across the strain gauge, and a change in its resistance is measured, which is a measure of the strain on the flow tube and in turn of the pressure of the fluid therein. Thus, according to the invention, the control circuit, by means of the strain gauge per se, generates a signal indicative of the pressure of the fluid.

In the context of the present invention "a communication module" should be understood as the communication electronics of a transmission system of the consumption meter, typically arranged on a printed circuit board and operated by the control circuit, and for transmitting the said signals from the consumption meter to a data collector of the utility network, such as by wireless radio communication. In the context of the present invention it should be understood that the communication module may include an antenna as well.

Also in the context of the present invention "a data collector" should be understood as a main collector of consumption data at the utility provider or as a sub-collector in terms of a concentrator as a concentrator node collecting data from a group of consumption meters, and in turn to the main collector.

As mentioned above the communication may involve wireless radio communication, the consumption meters being remotely arranged at consumption sites relative to a centrally arranged data collector.

The individual consumption meters may communicate directly with the main collector or via a sub-collector. Also the individual consumption meters may communicate with the main collector or the sub-collector via routers or via repeater nodes, which in turn may be consumption meters per se or may be dedicated routers or repeater units.

Accordingly, the utility network may be a single-hop network or a multi-hop network.

With the system of consumption meters of the present invention, the strain gauge technology offers a simple, cost-efficient and reliable way of provision of pressure information. Being integrated with the consumption meter, the strain gauge provides pressure data measured at the consumer sites, and which are directly related to flow data for the same consumer sites, which in turn provides valuable information on the utility network status to the operator, e.g. for controlling the water pressure applied onto a water network and for monitoring the network in terms of blocks and leaks.

The consumption meter of the invention may preferably be a battery powered consumption meter, the battery being used for powering the control circuit, the communication module etc.

The cost-efficiency of the strain gauge technology allows for the application of strain gauges with a high number of the consumption meters with the network. Thus, according to a preferred embodiment of the invention the plurality of consumption meters covers 10% or more of all consumption sites in the utility network, such as more than 20%, such as more than 30%, such as more than 40%, such as more than 50% of all consumption sites in the utility network.

With such high ratios of consumption meters of the utility network being equipped with pressure measurements facilities in terms of strain gauges, detailed information of the pressure status of the network is available, allowing the operator to closely monitor and control the network and the pressure applied thereto.

According to the invention the control circuit is preferably further arranged for operating a second strain gauge arranged at the outer surface of the flow tube to generate the signal indicative of the pressure of the fluid.

The application of an additional strain gauge beyond the first strain gauge allows for more precise determination of the pressure, e.g. at two positions of the flow tube.

According to an embodiment of the invention, the control circuit is preferably arranged for generating the signal indicative of the pressure of fluid from the difference between signals from the first strain gauge and the second strain gauge.

With such generation of the signal indicative of the pressure a more precise determination of the pressure is possible, which in turn may compensate for e.g. aging effects of the strain gauges.

According to a preferred embodiment of the invention the flow tube of the ultrasonic consumption meter has a first strain gauge zone of a first flow tube wall thickness and a second strain gauge zone of a second flow tube wall thickness, wherein the first strain gauge is arranged at the first strain gauge zone and the second strain gauge is arranged at the second strain gauge zone, and wherein the first flow tube wall thickness is smaller than the second flow tube wall thickness.

With this embodiment of the invention, the two strain gauges are applied to strain gauge zones of different wall thickness. Such zones will show different deformation upon application of a given pressure, i.e. a zone of smaller wall thickness is likely to show a higher deformation than does a zone of higher wall thickness.

Such arrangement of the strain gauges allows for compensation for any thermal effect from the flow tube and the strain gauges per se, e.g. by applying the principle of differential derivation of the pressure-indicative signal.

Further with this embodiment of the invention, the first and second strain gauges are preferably identical.

According to an embodiment of the invention the consumption meters of the system comprise temperature measuring means for measuring the temperature of the flow tube and/or the first strain gauge, and the signal indicative of the pressure of the fluid is compensated for the temperature of the flow tube and/or the first strain gauge.

Being typically narrow lines of thin metallic foil, the resistance of the strain gauge is likely to change with the temperature. Thus the dimensions of the flow tube may change due to thermal expansion, which will be detected by the strain gauge as a deformation. Also the internal resistance of the strain gauge per se may change with temperature. Such changes of the resistance of the strain gauge, however, do not relate to the pressure of the fluid and should be compensated for. Accordingly it is advantageous to measure the temperature of the flow tube and/or the first strain gauge, which in turn are in thermal equilibrium, and to compensate any signal indicative of the pressure of the fluid for any thermal effect.

According to an embodiment of the invention, the temperature measuring means comprises a temperature sensor. Such temperature sensor may be arranged onto the outer surface of the wall of the flow tube, or extend into the body of the wall of the flow tube to measure the temperature of the flow tube. Alternatively, the temperature sensor may be arranged adjacent to the strain gauge to measure the temperature thereof. Further alternatively, the temperature sensor may extend from the wall of the flow tube into the fluid or interfacing with the fluid across an area of thin wall thickness of the flow tube to measure the temperature of the fluid.

Thus according to another embodiment of the invention, the consumption meter comprises temperature measuring means for measuring the temperature of the fluid, and wherein the signal indicative of the pressure of the fluid is compensated for the temperature of the fluid.

Thus according to this embodiment, the temperature of the fluid is used as a measure for the temperature of the flow tube and/or the first strain gauge, based on thermal equilibrium between the fluid, the flow tube and the first strain gauge, and the temperature of the fluid is in turn used to compensate the signal indicative of the pressure of the fluid for thermal effects.

According to a preferred embodiment of the invention, the temperature measuring means comprises the two ultrasonic transducers, and measuring the temperature of the fluid comprises measuring a first transit time of a first ultrasonic signal transmitted in a first direction in the flow tube and a second transit time of a second ultrasonic signal transmitted in a second, opposite direction in the flow tube, and deriving the temperature of the fluid from the first and second transit times.

The absolute transit time of the propagating ultrasonic signals as provided by the ultrasonic transducers may thus be used to determine the temperature of the fluid. This is based on the observation that in the temperature range of 0-72 degrees C. there is an unambiguous correlation between the velocity of sound in water and the temperature of the water. Thus, upon determination of the absolute transit time the temperature may be derived.

Accordingly, beyond being a precise and reliable flow measurement technology, the ultrasonic technology applied with the system of the present invention has the further advantage of allowing precise temperature measurements.

In order to minimize the compensation for any thermal effect, the strain gauge according to a preferred embodiment of the invention has a temperature characteristic which is matched to compensate the thermal expansion coefficient of the flow tube.

Thus strain gauges are available with different temperature characteristics so that the temperature effects on the resistance of the strain gauge per se may cancel out the resistance change of the strain gauge due to the thermal expansion of the object on which the strain gauge is arranged. Thus strain gauges from various alloys like constantan alloys may be used which have a temperature dependency of their resistances which are matched to materials of different thermal expansion like stainless steel, copper, brass etc.

Thus, according to a preferred embodiment of the invention, the flow tube of the ultrasonic consumption meter is made from a metal, preferably selected from one or more of the group of stainless steel, galvanized steel, copper, brass or red brass. Preferably the strain gauge has a thermal characteristic adapted hereto.

According to an alternative preferred embodiment of the invention, the flow tube of the ultrasonic consumption meter is made from a polymer, preferably selected from one or more of the group of polyphenylene sulphide (PPS), polyether sulphone (PES), polysulphone (PSU), polystyrene (PS) or polyamide (PA). Preferably the strain gauge has a thermal characteristic adapted hereto.

Moreover, the material of the flow tube of the ultrasonic consumption meter may be made from a composite material further comprising a second material such as carbon, preferably carbon fibres, metal, preferably metal powder, glass, glass fibres or the like to adjust the properties of the polymer, and in turn of the flow tube.

Composite flow tubes are usually more deformable than are e.g. metallic flow tubes. Accordingly, applying strain gauges with composite flow tubes provides higher relative sensitivity of the strain gauge as compared to their application with metallic flow tubes, and in turn more precise measures of the pressure and any variations thereof.

The system of the subject invention allows for improved controlling of the water pressure applied to a water network and for monitoring the network in terms of blocks and leaks.

Thus, in a preferred embodiment of the invention, the signal indicative of the pressure is compared to a threshold value, and a pressure failure warning is generated in case the threshold value is exceeded. In this context exceeding an upper threshold value includes high pressures, e.g. in terms of pressure transients being higher than the threshold value and involving risk of pipeline bursts, as well as low pressures, e.g. as experienced with defect valves, and being lower than a lower threshold value, involving risk of pipeline implosion.

Such information is valuable to the operator of the utility network.

Also information relating to average pressure levels and peak (e.g. maximum) pressure levels as obtained over a period of time may be valuable to the operator, and the control circuit may be arranged to derive and communicate such data.

In a preferred embodiment of the invention the communication module communicates the signal indicative of the flow rate of the fluid and the signal indicative of the pressure of the fluid in a single data packet to the data collector. Such data packets preferably comprise corresponding values of flow and pressure indication.

In embodiments of the first aspect of the invention, the consumption meter may be or may be part of a charging consumption meter or utility meter, e.g. a water meter for cold and/or hot water, a gas meter, a heat meter, a cooling meter, an energy meter or a smart meter, where the consumption meter is arranged for measuring consumption data of a supplied utility used as a basis for billing. The consumption meter may be used in connection with district heating, district cooling and/or distributed water supply. The consumption meter may be a legal meter, i.e. a meter which is subdued to regulatory demands. Such regulatory demands may be demands to the precision of the measurements.

By way of measuring principle, the consumption meter is based on ultrasonic flow measurement and includes an ultrasonic flow meter part. The ultrasonic flow meter is a transit time flow meter arranged to measure a flow rate of a fluid flowing in a flow channel by use of known operation principles for transit time flow meters, where ultrasonic signals are emitted at one transducer and received at the other transducer, and where the difference in time-of-arrival between oppositely propagating signals is measured and converted into a flow rate. The ultrasonic, e.g. piezoelectric, transducers are operated by the control circuit, which generates a signal indicative of the flow rate of the fluid. The level of signal treatment of the control circuit may vary from basic signal treatment, where processed signals are output to a further electronic unit for further signal processing, to a complete signal treatment resulting in the determination of the flow rate.

In a second aspect of the invention a method is provided of measuring a pressure of a fluid in a utility network by means of a system according to the first aspect of the invention, the method comprising:
   operating the two ultrasonic transducers by means of the control circuit to generate the signal indicative of the flow rate of the fluid;
   communicating the signal indicative of the flow rate of the fluid to the data collector;
   operating a first strain gauge by means of the control circuit to generate the signal indicative of the pressure of the fluid; and
   communicating the signal indicative of the pressure of the fluid to the data collector.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
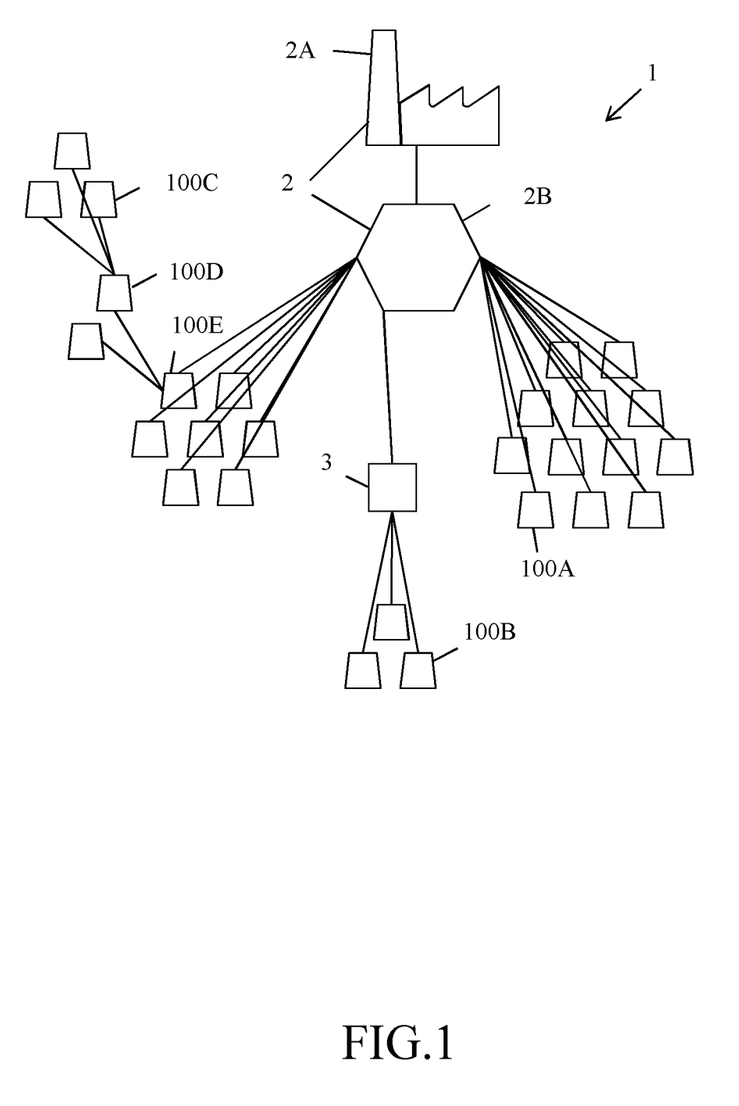
FIG. 1 shows the system of the present invention.

FIG. 1 shows the system of the present invention.

The figure illustrates a system with a network 1 comprising a plurality of consumption meters 100A-100E and data collector 2, 2A, 2B, here in the form of a sub-collector and a main collector, the main collector being the collection system 2A at the utility provider, whereas the sub-collector being a concentrator unit 2B arranged as a concentrator node in the network to collect consumption data from a group of consumption meters. Preferably the entire network is a radio network, or at least the network between the concentrator and the consumption meters is a radio network, whereas the network between the sub-collector 2B and the main collector 2A may be of any suitable type. The number of consumption meters in the plurality of meters may range from a few tens of meters to several thousands of meters connected in the network.

To ensure the all nodes (i.e. all consumption meters and all other network devices) of the network are properly connected, a rather complex network often results, in particular in residential areas. For example meters 100A are connected to the main collector 2A via direct connection to the concentrator 2B. The meters 100B are connected to the concentrator via a router node 3. The meters 100C are connected to the concentrator via meters 100D and 100E, which act as router or repeater nodes. Not shown in the figure are consumption meters which are connected, i.e. which transmit directly to the main collector 2A.

Figure 2:
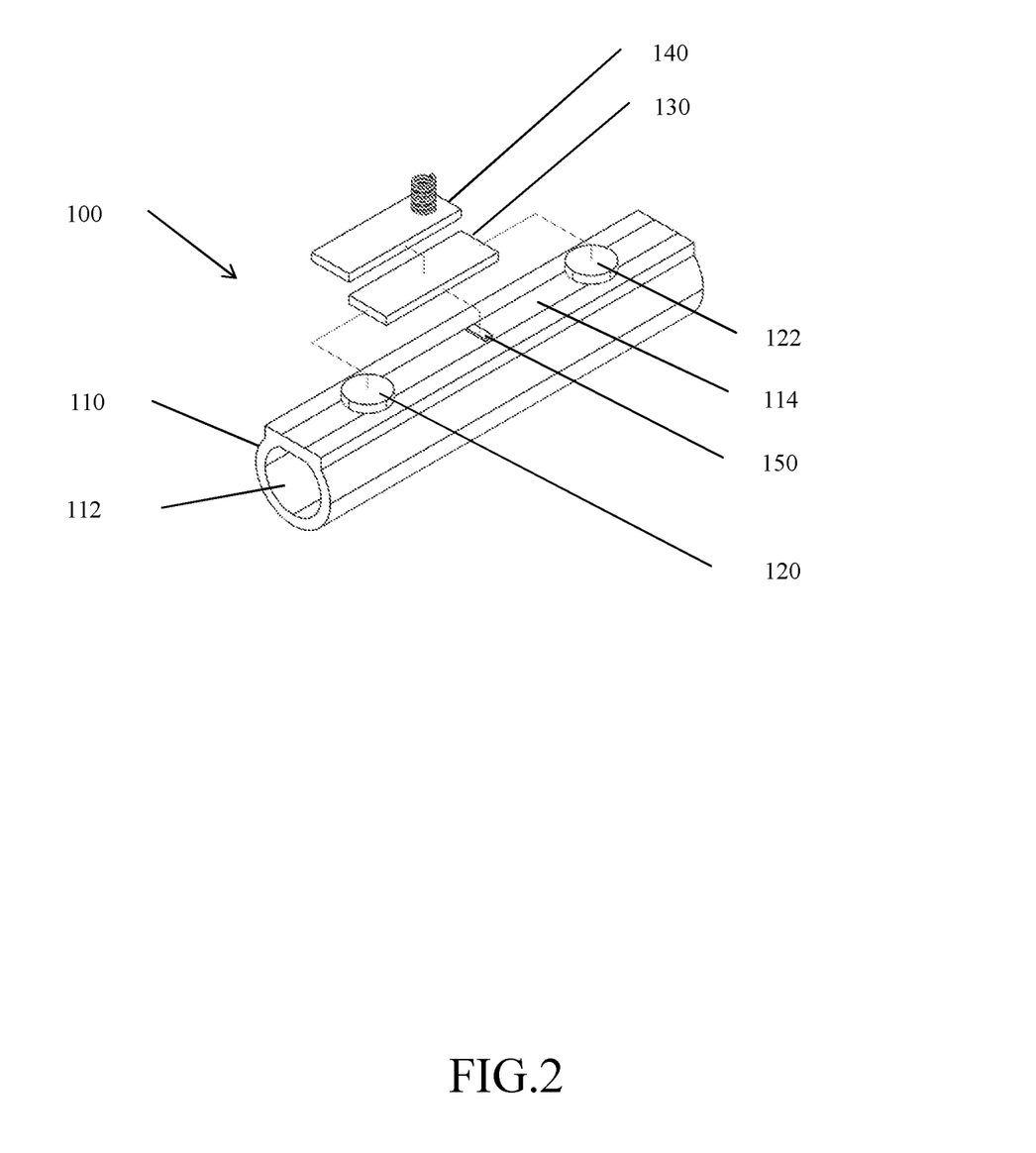
FIG. 2 shows a schematic of the consumption meter as applied with the system of the present invention.

FIG. 2 shows a schematic of the consumption meter 100 as applied with the present invention. The consumption meter 100 has a flow tube 110 with a through-going opening 112 for passage of a fluid between an inlet and an outlet, the tube having a wall with an outer surface 114. With the flow tube 110 two piezoelectric transducers 120, 122 are arranged at the outer surface 114 of the flow tube 110, so that ultrasonic signals are transmitted through the wall.

A control circuit 130 is arranged with the consumption meter 100 for operating the two piezoelectric transducers 120, 122 and to generate a signal indicative of the flow rate of the fluid, which signal is in turn communicated from the consumption meter 100 by means of communication module 140 connected to the control circuit 130. A first strain gauge 150 is arranged at the outer surface 114 of the flow tube 110, and, when operated by the control circuit 130, allows the generation of a signal indicative of the pressure of the fluid.

Any deformation of the flow tube 110 may be defined by means of the strain tensor S, $$S = \begin{pmatrix} S_{xx} & S_{xy} & S_{xz} \\ S_{yx} & S_{yy} & S_{yz} \\ S_{zx} & S_{zy} & S_{zz} \end{pmatrix} = \begin{pmatrix} \frac{\partial X}{\partial x} & \frac{\partial X}{\partial y} & \frac{\partial X}{\partial z} \\ \frac{\partial Y}{\partial x} & \frac{\partial Y}{\partial y} & \frac{\partial Y}{\partial z} \\ \frac{\partial Z}{\partial x} & \frac{\partial Z}{\partial y} & \frac{\partial Z}{\partial z} \end{pmatrix},$$

defining strain in a dimension X,Y,Z upon application of a stress in a dimension x,y,z.

According to the invention one or more of the strain components $S_{xx}, S_{xy} \ldots S_{zz}$ may be determined by means of applying one or more strain gauges to the flow tube.

At a hydrostatic pressure p of the fluid in the tube, a strain component, per this example $S_{xx}$ relates to the pressure according to:

$$S_{xx} = \alpha(z)\frac{p}{E},$$

wherein E is the elasticity module of the flow tube material and $\alpha(z)$ is the conversion factor, which in turn depends on the flow tube geometry.

With the strain gauge a change in the resistance ($\Delta R$) is measured upon application of the fluid pressure and a deformation according to:

$$\Delta R = R_G S_{xx} = R_G \alpha \frac{p}{E},$$

and thus:

$$p = \frac{E}{\alpha R_G} \Delta R,$$

wherein $R_G$ is the resistance of the strain gauge in its non-deformed state.

Figure 3:
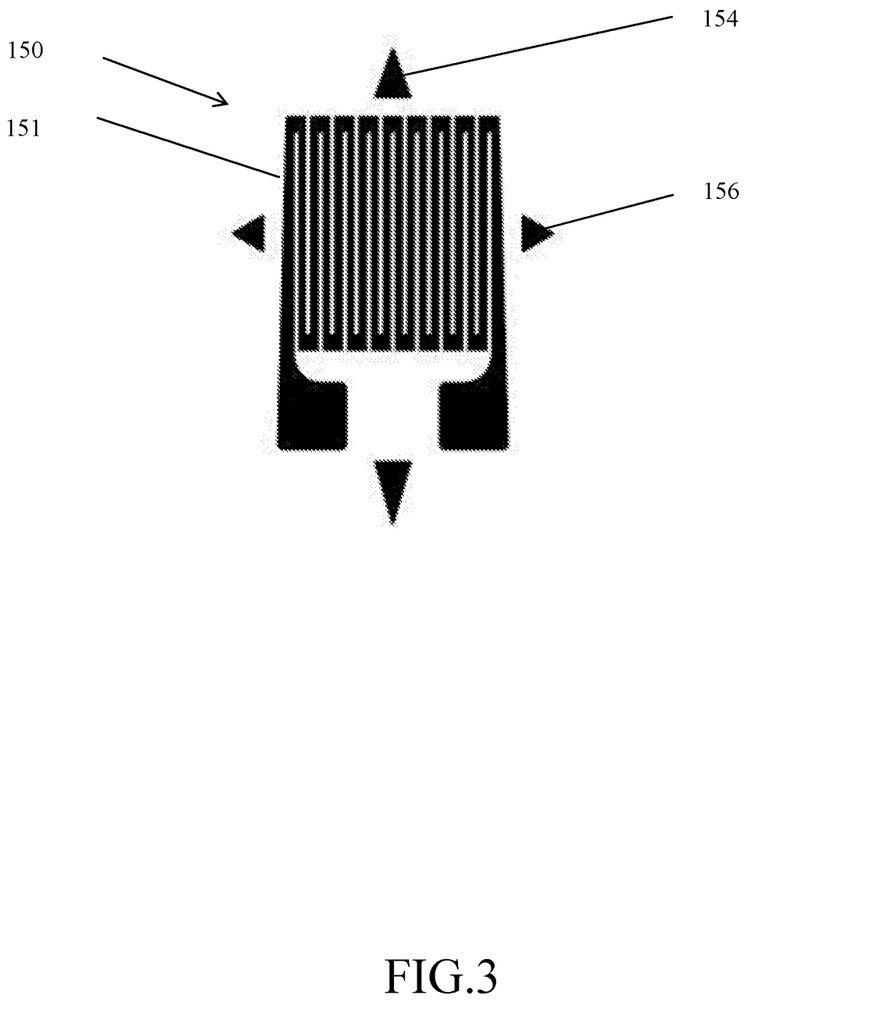
FIG. 3 shows a schematic of the strain gauge as applied with the present invention.

FIG. 3 shows a schematic of the strain gauge 150. The strain gauge 150 has narrow lines 151 of thin metallic foil connected in series and supported on an insulating flexible backing of polymer (not shown). According to its structure the strain gauge is more sensitive, in terms of changes of its resistance, to strains in the longitudinal direction 154 of the narrow lines 151 than to strains in the directions perpendicular 156 thereto.

Figure 4:
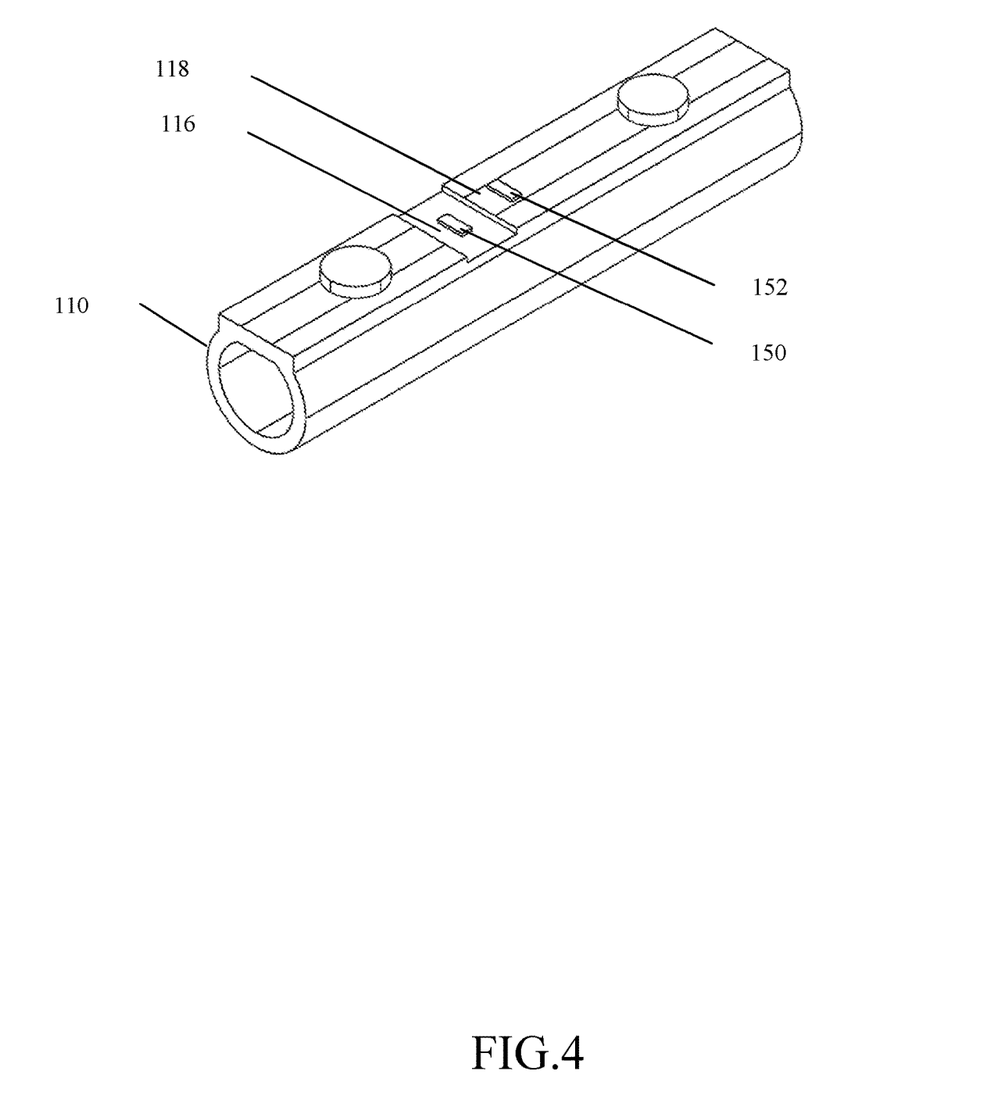
FIG. 4 shows the flow tube with two strain gauge zones.

FIG. 4 shows a flow tube 110 with first strain gauge 150 and a second strain gauge 152 arranged at two strain gauge zones 116, 118, respectively, of different wall thickness. Such zones 116, 118 have different conversion factors.

Upon pressure application and co-occuring thermal changes ΔT resistance of the strain gauge arranged at a first strain gauge zone may further change:

$$\Delta R_1 = R_G \left[ \alpha_1 \frac{p}{E} + (\alpha_R + \beta_{tube} - \beta_{gauge}) \Delta T \right],$$

wherein $\beta_{tube}$ is the thermal expansion coefficient of the flow tube, $\alpha_R$ is the thermal coefficient of the strain gauge resistance, and $\beta_{gauge}$ is the thermal expansion coefficient of the strain gauge per se.

Similar applies to a second, per this example identical strain gauge, which may be arranged at a second strain gauge zone of a different conversion factor $\alpha_2$:

$$\Delta R_2 = R_G \left[ \alpha_2 \frac{p}{E} + (\alpha_R + \beta_{pipe} - \beta_{gauge}) \Delta T \right]$$

Assuming that $\alpha_1$ and $\alpha_2$ are not identical, the fluid pressure may now be derived from the difference between the two changes of the resistances:

$$p = \frac{E}{R_G} \frac{\Delta R_1 - \Delta R_2}{\alpha_1 - \alpha_2}$$

Figure 5:
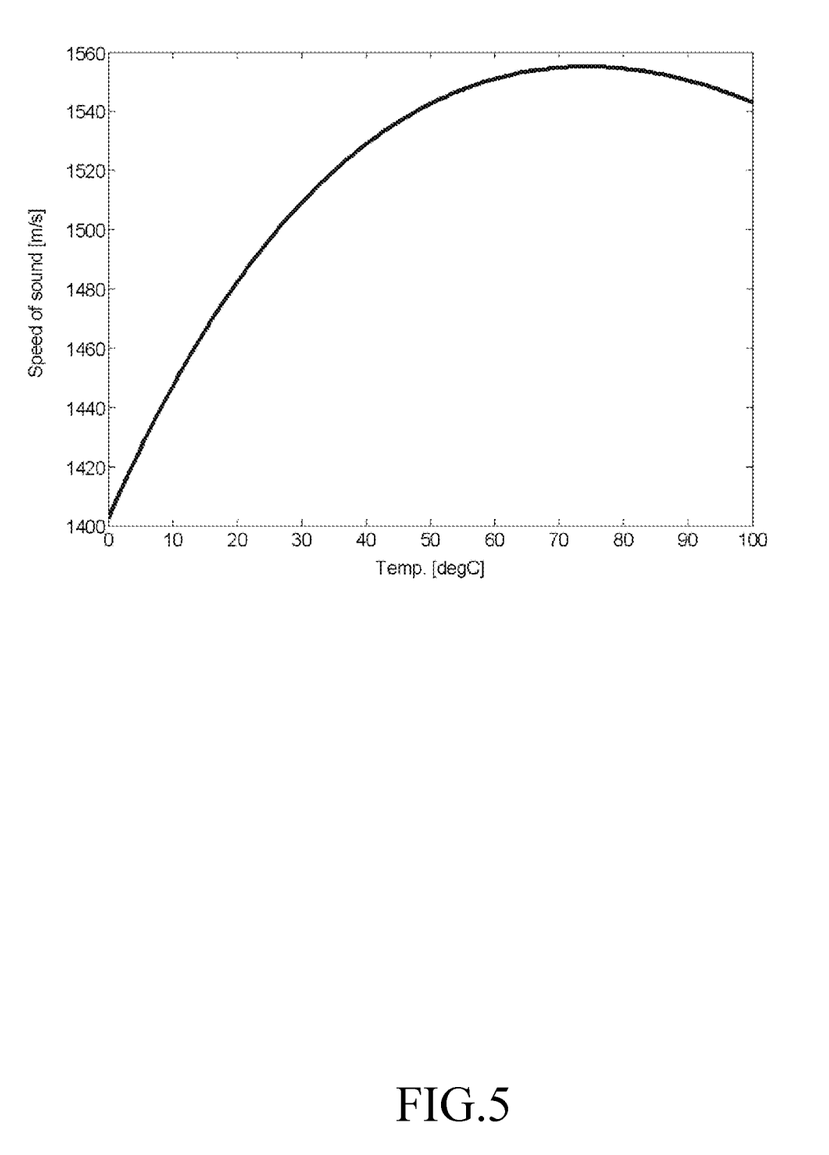
FIG. 5 shows the velocity of sound in water relative to the temperature.

FIG. 5 shows the velocity of sound in water vs. temperature in the temperature range 0-100 degrees C. As can be seen from the figure there is an unambiguous correlation between the velocity of sound in water and the temperature of the water in the temperature range 0-72 degrees C. Thus in that temperature range the temperature of the fluid may be unambiguously derived from the velocity of sound in the fluid and in turn from the absolute transit time of propagating ultrasonic signals.

Figure 6:
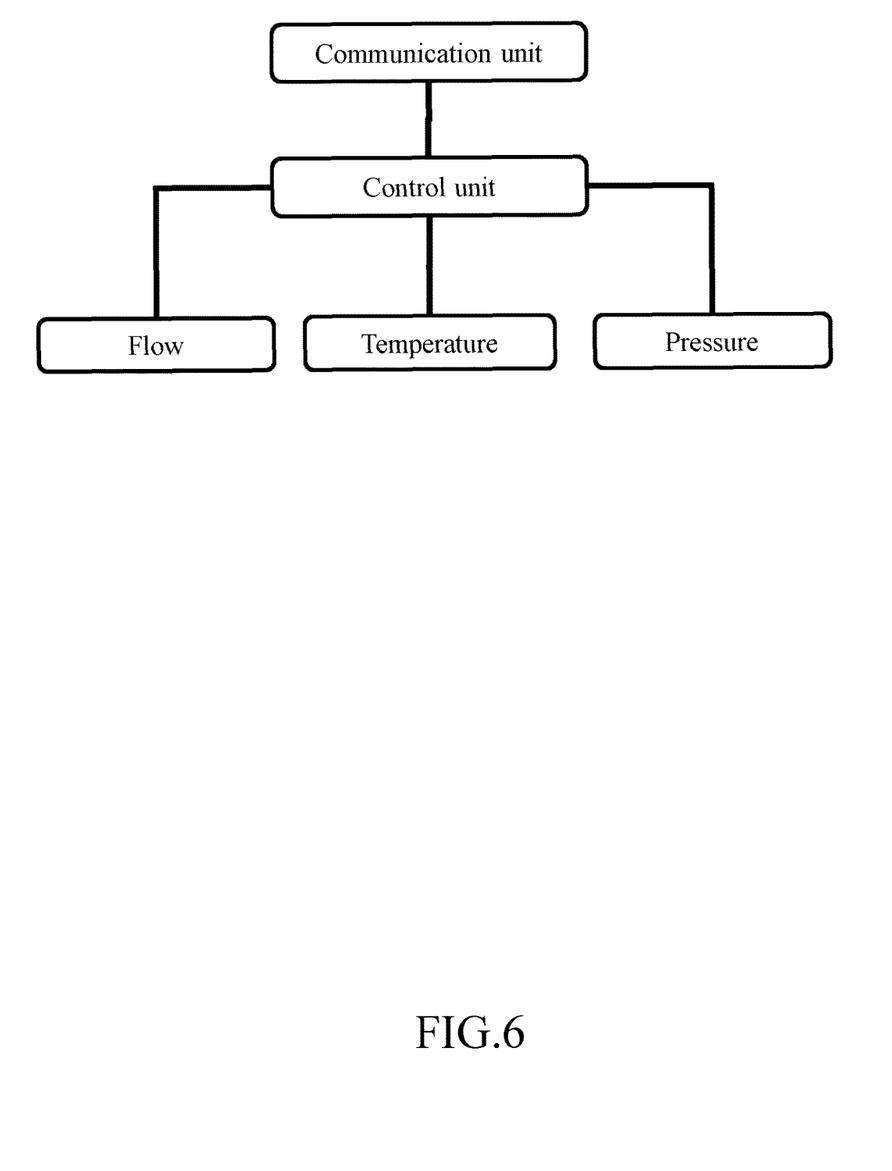
FIG. 6 shows a diagram of elements of embodiments of the consumption meter as applied with the system of the subject invention.

FIG. 6 shows a diagram of elements of embodiments the consumption meter applied with the subject invention. Thus the control unit 130 controls measurement of the flow of the fluid via the transducers 120, 122 and of the pressure of the fluid via strain gauge 150. Also the control unit 130 controls the measurement of the temperature of the flow tube 110 and/or the strain gauge 150, either via temperature sensors or via measurement of the absolute transit time of propagating ultrasonic signals. The control unit 130 is connected to the communication unit 140, which is arranged for communicating flow data and pressure data, in particular pressure data, which are temperature effect compensated, to an operator of the network of which the consumption meter is part.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A system for measuring consumption data of a utility in terms of a supplied fluid comprising:
    a plurality of ultrasonic consumption meters arranged in a utility network that includes a data collector for collecting the consumption data,
    wherein each of the plurality of ultrasonic consumption meters are arranged to measure a flow rate of the supplied fluid and a pressure of the supplied fluid,
    wherein each of the plurality of ultrasonic consumption meters includes:
        a flow tube with a through-going opening for passage of the fluid between an inlet and an outlet, the flow tube having a wall with an outer surface;
        two ultrasonic transducers arranged at the outer surface of the flow tube, so that ultrasonic signals are transmitted through the wall;
        a control circuit arranged for operating the two ultrasonic transducers to generate a signal indicative of the flow rate of the fluid, and for operating a first strain gauge to generate a signal indicative of the pressure of the fluid; and
        a communication module connected to the control circuit and arranged for communicating the signal indicative of the flow rate of the fluid and the signal indicative of the pressure of the fluid to the data collector;
        wherein the flow tube is made from a polymer, and the first strain gauge is arranged at the outer surface of the flow tube to measure the strain on the flow tube in response to the pressure of the fluid.

2. The system according to claim 1, wherein the control circuit is further arranged for operating a second strain gauge arranged at the outer surface of the flow tube to generate the signal indicative of the pressure of the fluid.

3. The system according to claim 2, wherein the flow tube of each of the plurality of ultrasonic consumption meters has a first strain gauge zone of a first flow tube wall thickness and a second strain gauge zone of a second flow tube wall thickness, wherein the first strain gauge is arranged at the first strain gauge zone and the second strain gauge is arranged at the second strain gauge zone, and wherein the first flow tube wall thickness is smaller than the second flow tube wall thickness.

4. The system according to claim 1, wherein the each of the plurality of consumption meters comprises temperature measuring means for measuring the temperature of the flow tube and/or the first strain gauge, and wherein the signal indicative of the pressure of the fluid is compensated for the temperature of the flow tube and/or the first strain gauge.

5. The system according to claim 1, wherein each of the plurality of consumption meters comprises temperature measuring means for measuring the temperature of the fluid, and wherein the signal indicative of the pressure of the fluid is compensated for the temperature of the fluid.

6. The system according to claim 5, wherein the temperature measuring means comprises the two piezoelectric transducers, and wherein measuring the temperature of the fluid comprises measuring a first transit time of a first ultrasonic signal transmitted in a first direction in the flow tube and a second transit time of a second ultrasonic signal transmitted in a second, opposite direction in the flow tube, and deriving the temperature of the fluid from the first and second transit times.

7. The system according to claim 1, wherein the first strain gauge has a temperature characteristic which is matched to compensate for the thermal expansion coefficient of the flow tube.

8. The system according to claim 1, wherein the flow tube of each of the plurality of ultrasonic consumption meters is made from a polymer selected from one or more of the group of polyphenylene sulphide (PPS), polyether sulphone (PES), polysulphone (PSU), polystyrene (PS) and polyamide (PA).

9. The system according to claim 8, wherein the flow tube of each of the plurality of ultrasonic consumption meters is made from a composite material further comprising a second material such as carbon, preferably carbon fibres, metal, preferably metal powder, glass or glass fibres.

10. The system according to claim 1, wherein the signal indicative of the pressure is compared to a threshold value, and a pressure failure warning is generated in case the threshold value is exceeded.

11. The system according to claim 1, wherein the communication module communicates the signal indicative of the flow rate of the fluid and the signal indicative of the pressure of the fluid in a single data packet to the data collector.

12. The system according to claim 1, wherein each of the plurality of consumption meters is selected from the group of a water meter, a gas meter, a heat meter, and a cooling meter.

13. A method of measuring a pressure of a fluid in a utility network by means of a system according to claim 1, the method comprising:

operating the two ultrasonic transducers by means of the control circuit {[(130)]} to generate the signal indicative of the flow rate of the fluid;
communicating the signal indicative of the flow rate of the fluid to the data collector;
operating the first strain gauge by means of the control circuit to generate the signal indicative of the pressure of the fluid; and
communicating the signal indicative of the pressure of the fluid to the data collector.

14. An ultrasonic consumption meter arranged to measure a flow rate of a supplied fluid and a pressure of the supplied fluid, the ultrasonic consumption meter comprising:

a flow tube with a through-going opening for passage of the fluid between an inlet and an outlet, the flow tube having a wall with an outer surface;
two ultrasonic transducers arranged at the outer surface of the wall of the flow tube, so that ultrasonic signals are transmitted through the wall;
a control circuit arranged for operating the two ultrasonic transducers to generate a signal indicative of the flow rate of the fluid, and for operating a first strain gauge to generate a signal indicative of the pressure of the fluid; and
a communication module connected to the control circuit and arranged for communicating the signal indicative of the flow rate of the fluid and the signal indicative of the pressure of the fluid;
wherein the flow tube is made from a polymer, and the first strain gauge is arranged at the outer surface of the of the wall of the flow tube to measure the strain on the flow tube in response to the pressure of the fluid.

* * * * *